United States Patent [19]

Sawada et al.

[11] Patent Number: 5,331,432
[45] Date of Patent: Jul. 19, 1994

[54] IMAGE FORMING APPARATUS

[75] Inventors: Kouichi Sawada; Hiroyuki Yamamoto, both of Hachioji; Yoshiyuki Ichihara, Chofu, all of Japan

[73] Assignee: Konica Corporation, Tokyo, Japan

[21] Appl. No.: 42,598

[22] Filed: Apr. 2, 1993

[30] Foreign Application Priority Data

Apr. 20, 1992 [JP] Japan ................ 4-099758

[51] Int. Cl.⁵ ............................................ H04N 1/40
[52] U.S. Cl. ...................................... 358/465; 358/461; 358/463; 358/455; 358/448; 358/296; 358/469; 382/53
[58] Field of Search ............... 358/461, 455, 458, 465, 358/466, 298, 300, 296, 401, 501, 463, 469; 250/235, 236; 382/53, 50, 51, 54

[56] References Cited

U.S. PATENT DOCUMENTS

| | | | |
|---|---|---|---|
| 4,709,250 | 11/1987 | Takeuchi | 358/300 |
| 4,800,442 | 1/1989 | Riseman et al. | 358/298 |
| 4,864,419 | 9/1989 | Saito et al. | 358/300 |

FOREIGN PATENT DOCUMENTS 39974 2/1987 Japan .
157070 7/1987 Japan .

*Primary Examiner*—Edward L. Coles, Sr.
*Assistant Examiner*—Fan Lee
*Attorney, Agent, or Firm*—Finnegan, Henderson Farabow, Garrett & Dunner

[57] ABSTRACT

An apparatus for forming an image with modulated image lights which are obtained by modulating an image light in accordance with image signals, including a reference pattern signal generation circuit, a comparator to compare image signals with a reference pattern signal so as to produce a pulse width modulation signal, and a circuit to shift the level of the image signal of either a maximum or minimum value to a level out of the amplitude of the reference pattern signal.

4 Claims, 6 Drawing Sheets

IMAGE FORMING APPARATUS

BACKGROUND OF THE INVENTION

The present invention relates to an image forming apparatus, and more particularly to an image forming apparatus which is structured in the manner that a light beam source is internally modulated corresponding to a pulse width modulation signal which is obtained corresponding to an image signal.

Generally, an image forming apparatus, such as a digital copying machine in which a laser beam is used, is composed of a scanner section 300, an image processing section 400 and a printer section 100 as shown in FIG. 5. (Refer to Japanese Patent Publication Open to Public Inspection No. 157070/1987, or the like.) The scanner section 300 optically scans documents 200, and image information of the documents 200 is converted into an optical image. The optical image is supplied to the image processing section 400 and converted into an image signal, and at the same time, a predetermined image processing operation is conducted.

The image processing operation includes variable magnification processing, halftone processing, and inside-void processing, and in the case of a color copying machine, color ghost processing.

In the printer section 100, an image is recorded according to a digital image signal (pixel data) having predetermined bits formed in the image processing section 400.

FIG. 6 shows an example of the printer section 100. In this example, an electrophotographic printer having a photoreceptor drum therein is used, and also a laser beam is used for a light source by which an electrostatic latent image is formed on the photoreceptor drum.

In FIG. 6, pixel data (DATA) outputted from the image processing section 400 is supplied to a modulation circuit 110. In the modulation circuit 110, a pulse width modulation signal (SPWM) is formed according to the pixel data (DATA).

The pulse width modulation signal (SPWM) formed in the modulation circuit 110 is supplied to a semiconductor laser 931 (light source) through a laser drive circuit 932, and modulates internally laser beams. The laser drive circuit 932 is controlled by a control signal outputted from a timing circuit 933 so that the laser is driven only within a horizontal and vertical effective area by the laser drive circuit 932.

A signal showing a light amount of laser beams is fed back from a semiconductor laser 931 to the laser drive circuit 932, and the semiconductor laser is controlled so that its light amount becomes constant.

Laser beams outputted from the semiconductor laser 931 are supplied to a polygonal mirror 935 and deflected. A starting point of scanning of the laser beams, deflected by the polygonal mirror 935, is detected by an index sensor 936. The detection signal from the index sensor 936 is converted into a voltage signal by a current/voltage conversion amplifier 937, and then an index signal SI is formed. The index signal is supplied to a control means by which optical scanning timing of the scanner section 300 is controlled.

Numeral 934 is a drive circuit of a motor by which the polygonal mirror 935 is rotated, and ON and OFF signals for the circuit are supplied from the timing circuit 933.

FIG. 7 is an example of an image exposure system in which a laser beam spot is formed (a laser beam scanner).

Laser beams emitted from the semiconductor laser 931 are incident on the polygonal mirror 935 through mirrors 942 and 943. Laser beams are deflected by the polygonal mirror 935, and irradiate the surface of a photoreceptor drum 130 (a recording medium) through an fθ lens 944 by which a laser beam spot is formed so that the diameter of the beam can be a predetermined value.

Numerals 945 and 946 are cylindrical lenses for tilting angle compensation.

Then, laser beams scan the surface of the photoreceptor drum 130 at a predetermined speed in the predetermined direction a, and thereby exposure is conducted corresponding to the pixel data so that an electrostatic latent image is formed. Next, a toner which is charged reversely to the electrostatic latent image by a conventional structure, adheres to the electrostatic latent image and development is conducted. Then, a recording sheet is superposed onto the toner image, charged reversely to the toner image by a corona charger from the rear side of the recording sheet, and then the toner image is transferred onto the recording sheet. Further, the transferred toner image is fixed onto the recording sheet when the toner image is heated or pressed.

In the modulation circuit 110, a pulse width modulation signal (SPWM) is formed by the method disclosed in, for example, Japanese Patent Publication Open to Public Inspection No. 39974/1987.

That is, a digitalized image signal (pixel data) is converted into an analog signal, and when the converted signal is compared with a periodical pattern signal such as a triangle wave as shown in FIG. 8, the pulse width modulation signal (SPWM) having a pulse width corresponding to the image signal can be obtained.

In the structure disclosed in Japanese Patent Publication Open to Public Inspection No. 39974/1987, full-scale amplitude of the image signal can be contained in an amplitude area of the pattern signal, and in the case where the pattern signal is compared with the image signal, a pulse width modulation signal having a predetermined pulse width can be obtained even when the amplitude of the image signal is maximum or minimum.

Accordingly, in the case where fluctuations caused by noises or the like are generated in the pulse width modulation, the laser can not be controlled to be positively turned off or turned on fully, when amplitude of the image signal is maximum or minimum. Therefore, noises are generated on white background and solid areas, so that image reproducibility is lowered, which is a problem.

SUMMARY OF THE INVENTION

The object of the present invention is to solve the foregoing problems and to improve image reproducibility of the white background and solid areas as follows. The image reproducibility of the white background and solid areas can be improved by the structure of an image forming apparatus in which: a pulse width modulation signal is formed when an image signal is compared with a predetermined periodical pattern signal; a laser is not affected by fluctuations of a pulse width modulating operation when amplitude of an image signal is maximum or minimum; and thereby the laser is positively turned off or turned on fully.

The image forming apparatus according to the present invention in which the intensity of a light source is internally modulated according to an image signal and an image is formed on a recording medium, comprises: a pattern signal generating means by which a pattern signal with a predetermined period is generated; a comparing means by which a pulse width modulation signal is generated, which is used in order to internally modulate the light source by comparing the image signal with the pattern signal; and an out-of-area image signal setting means by which amplitude of the image signal, which is compared by the comparing means, is set at a certain level out of an amplitude area of the pattern signal in at least either the case where the amplitude of the image signal is maximum or where it is minimum.

Further, the out-of-area image signal setting means may be replaced with an out-of-area pattern signal setting means by which an amplitude level of the pattern signal, which is compared by the comparing means, is set at a certain level out of the amplitude area of the image signal in at least either the case where the amplitude of the image signal is maximum, or where it is minimum.

In the image forming apparatus structured as described above, a pulse width modulation signal is not obtained when the image signal is directly compared with the pattern signal, in at least either the case where the amplitude of the image signal is maximum, or where it is minimum, but the pulse width modulation signal is obtained when the amplitude of the image signal out of the amplitude area of the pattern signal is set, or the amplitude of the pattern signal out of the amplitude area of the image signal is set.

Accordingly, in the case where the amplitude of the image signal is not maximum or minimum, the modulation signal with a predetermined pulse width is obtained when the image signal is compared with the pattern signal. Further, when the image signal is maximum or minimum, the pulse width modulation signal with a zero pulse width can be obtained, and thereby the light source can be controlled so that it is turned on fully or off without being affected by fluctuations in the pulse width modulation.

DETAILED DESCRIPTION OF THE PREFERRED EMBODIMENT

An example of the present invention will be described as follows.

Figure 1:
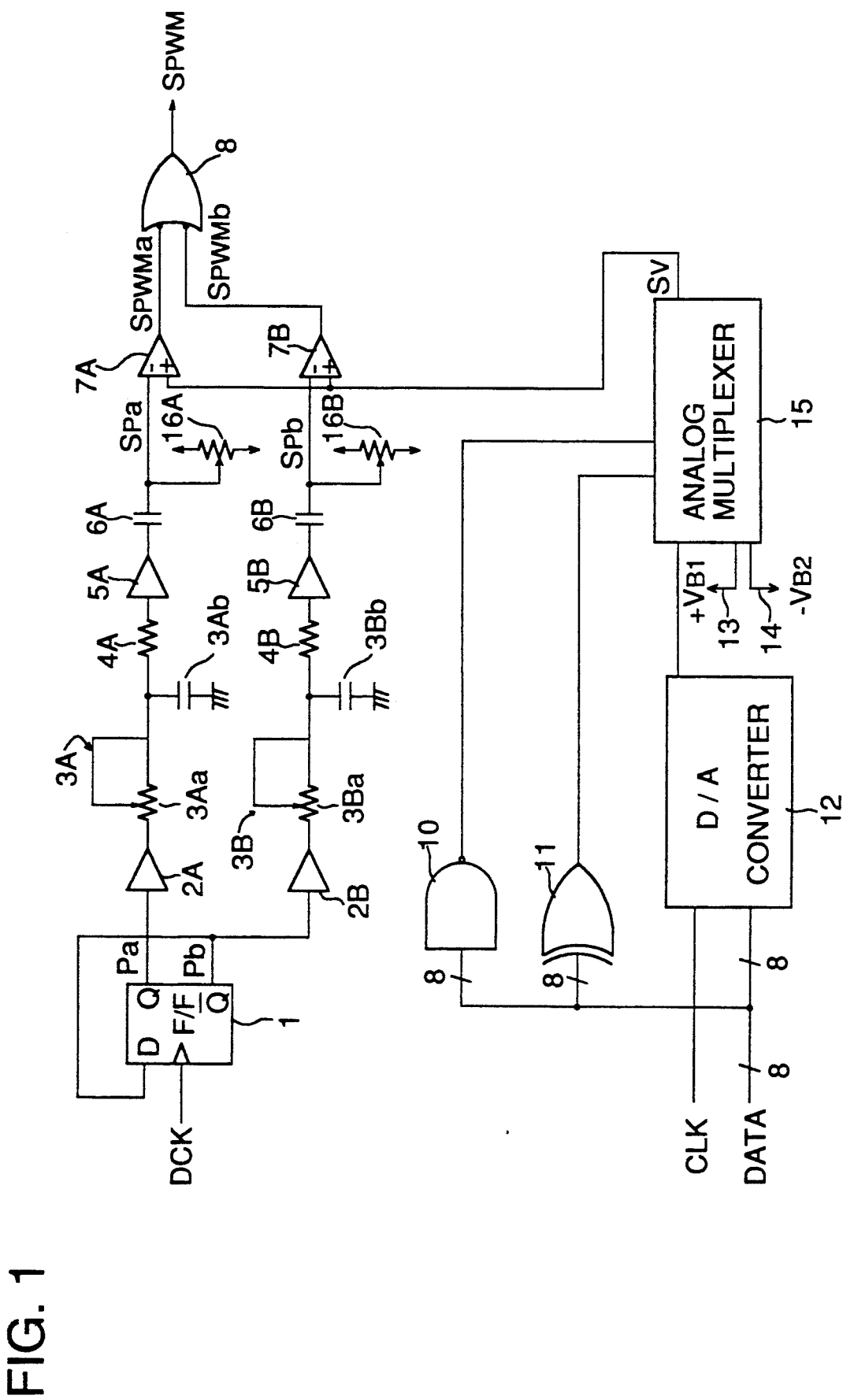
FIG. 1 is a circuit diagram showing a structure of a modulation circuit of a first example of the present invention.
Figure 6:
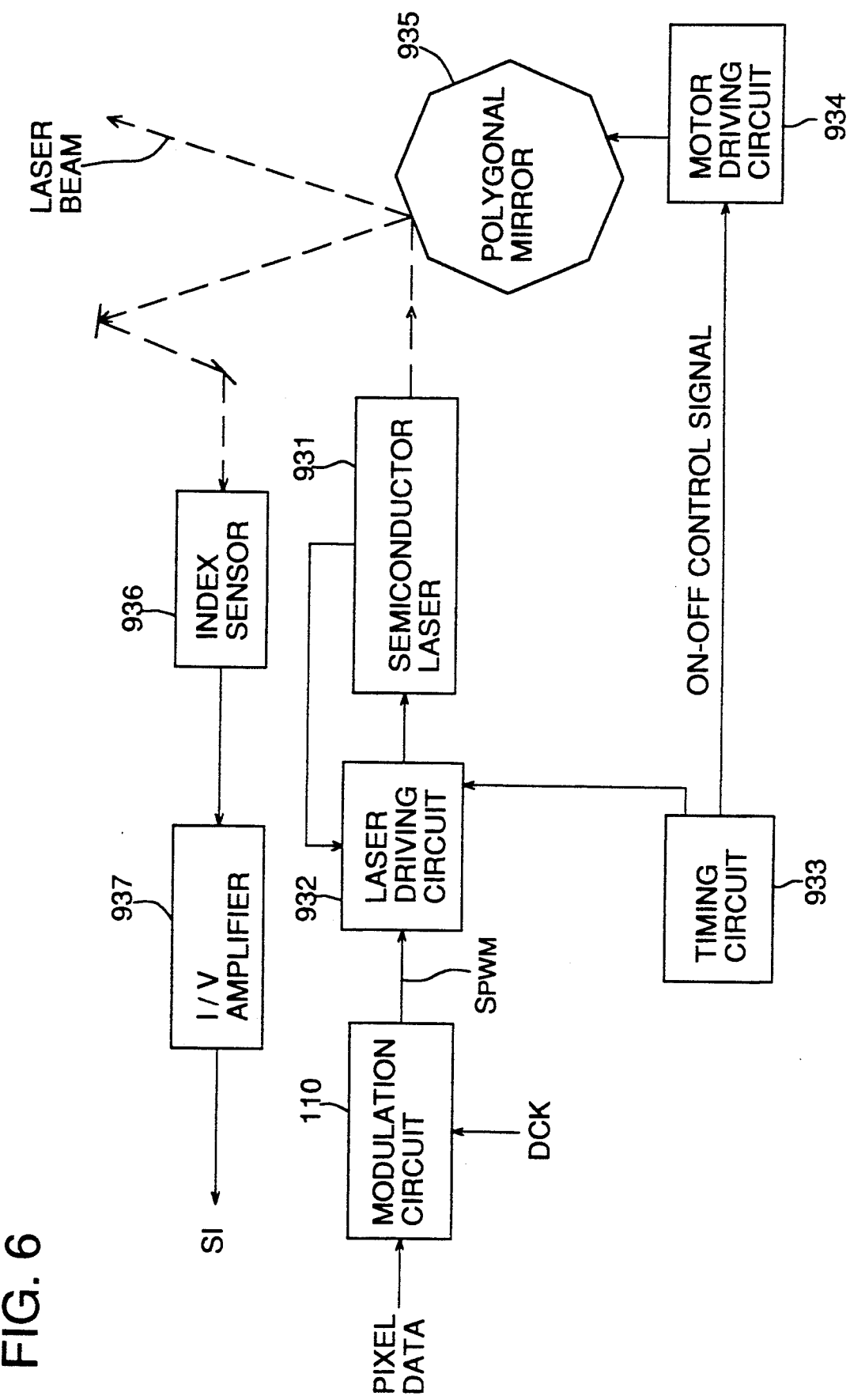
FIG. 6 is a block diagram showing an example of a structure of a printer section of the present invention.
Figure 7:
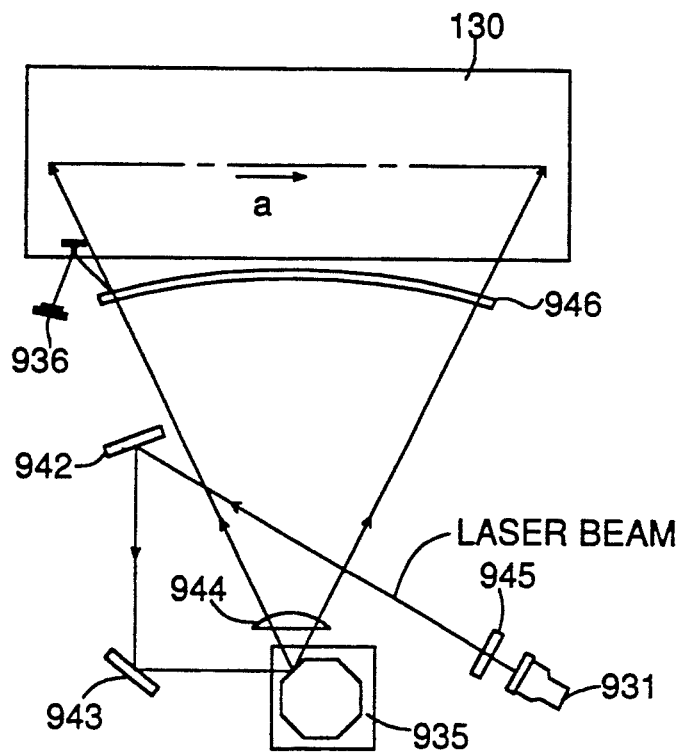
FIG. 7 is a view showing an image exposure system of the printer section.
Figure 8:
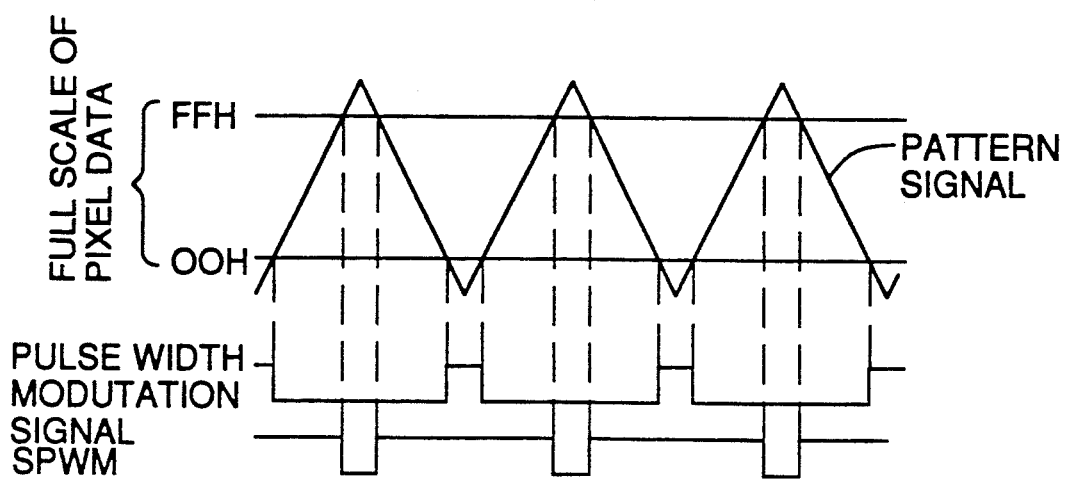
FIG. 8 is a time chart showing an example of a conventional pulse width modulating operation by which a pattern signal is compared with an image signal.

FIG. 1 is a view showing an example of a modulation circuit by which a pulse width modulation signal is formed from an image signal, and corresponds to a modulation circuit 110 in FIG. 6. Only the structure of the modulation circuit 110 will be explained in detail as follows, and other sections, of which the image forming apparatus is composed, will be only referred to in FIGS. 6 and 7, and the explanation thereof will be omitted.

In FIG. 1, a dot clock (DCK, a pixel clock) which is synchronized with digitalized pixel data (DATA, an image signal), is supplied to a clock terminal of a D flip-flop, of which a divider having a dividing ratio of ½ is composed, and an output signal Pb from a reversal output terminal (Q-bar) is supplied to a D terminal.

A pulse signal Pa outputted from a normal (non-reversal) output terminal Q of the D flip-flop 1 is supplied to an integrator 3A, which is composed of a variable resistor 3Aa and a capacitor 3Ab, through a buffer amplifier 2A. An output signal from the integrator 3A is supplied to a comparator 7A (a comparing means) as a pattern signal Spa through a serial circuit composed of a resistor 4A, a buffer amplifier 5A and a DC-cut capacitor 6A.

The upper half of an amplitude of the pattern signal Spa is adjusted so that it can be included within a fullscale range of 00H to FFH of a D/A converter 12 (which will be described later) by the variable resistor 3Aa, and its offset value (a DC value) is adjusted also by a variable resistor 16A.

The pulse signal Pb, (the phase of which is reverse to that of the pulse signal Pa), which is outputted from the reversal output terminal Q-bar of the D flip-flop, is supplied to an integrator 3B, which is composed of a variable resistor 3Ba and a capacitor 3Bb, through a buffer amplifier 2B. An output signal from the integrator 3B is supplied to a comparator 7B (a comparing means) as a pattern signal Spb through a serial circuit composed of a resistor 4B, a buffer amplifier 5B and a DC-cut capacitor 6B.

The upper half of an amplitude of the pattern signal Spb is adjusted so that it can be included within the fullscale range of 00H to FFH of the D/A converter 12 (which will be described later) by the variable resistor 3Ba, and its offset value (a DC value) is adjusted also by a variable resistor 16B.

The pattern signal generating means in the example is composed of: the D flip-flop 1; buffer amplifiers 2A, 2B; integrators 3A, 3B; resistors 4A, 4B; buffer amplifiers 5A, 5B; and DC-cut capacitors 6A, 6B.

An analog output signal from the D/A converter 12, to which the 8 bit pixel data (DATA) is supplied, is supplied to an analog multiplexer 15 (an out-of-area image signal setting means). In the foregoing, the analog multiplexer 15 selects either one of an analog signal outputted from the D/A converter 12, DC sources $+VB_1$ 13, or $-VB_2$ 14, corresponding to outputs from a NAND circuit 10, and an EX-OR circuit (exclusive-OR circuit) 11 to which the pixel data (DATA) is supplied, and supplies it to comparators 7A and 7B as a image signal Sv. CLK is a clock for a D/A converting operation.

The NAND circuit 10 outputs a low level output only in the case where an amplitude of the pixel data (DATA) is FFH (a maximum value), and in other cases the circuit 10 outputs a high level output. The EX-OR circuit 11 outputs a low level output only in the case where an amplitude of the pixel data (DATA) is FFH (a maximum value) or 00H (a minimum value), and in other cases the circuit 11 outputs a high level output. Accordingly, in the case where the output of the EX-OR circuit 11 is low level, it can be discriminated that the pixel data (DATA) is 00H or FFH, and it can be discriminated that the pixel data (DATA) is 00H or FFH according to the output of the NAND circuit 10 at the time.

In the foregoing, when the 8 bit pixel data (DATA) is 01H to FEH, the output of the NAND circuit 10 is high level, the output of the EX-OR circuit 11 is high level, and the analog signal outputted from the D/A converter 12 is selected by the analog multiplexer 15 and supplied to comparators 7A and 7B as the image signal Sv.

When the pixel data (DATA) is 00H (a minimum value), the output of the NAND circuit 10 is high level, the output of the EX-OR circuit is low level, and the multiplexer 15 selects the DC source $+VB_1$ and supplies it to comparators 7A and 7B as the image signal Sv.

Further, when the pixel data (DATA) is FFH (a maximum value), the output of the NAND circuit 10 is low level, the output of the EX-OR circuit 11 is low level, and the multiplexer 15 selects the DC source $-VB_2$ and supplies it to comparators 7A and 7B as the image signal Sv.

As described above, the output of the D/A converter 12 when the pixel data (DATA) is 01H to FEH, the DC source $+VB_1$ when the pixel data (DATA) is 00H (a minimum value), or the DC source $-VB_2$ when the pixel data (DATA) is FFH (a maximum value) are selectively outputted respectively from the analog multiplexer 15.

In this case, the amplitude of the voltage of the DC source $+VB_1$ 13, or $-VB_2$ 14 is set on the positive side or on the negative side out of the amplitude area of pattern signals Spa and Spb, respectively, so that the amplitude of the voltage is out of the amplitude areas of the pattern signals. When the output of the DC source $+VB_1$ 13 or $-VB_2$ 14 is selectively supplied to comparators 7A and 7B as the image signal Sv, the maximum value or minimum value of the image data (DATA) is compared with the pattern signal by the comparators 7A and 7B as a signal which is out of the amplitude area of the pattern signals Spa and Spb.

The pattern signal Spa outputted from the integrator 3A is compared with the image signal Sv outputted from the analog multiplexer 15 by the comparator 7A. On the other hand, the pattern signal Spb outputted from the integrator 3B is compared with the image signal Sv outputted from the analog multiplexer 15 by the comparator 7B. The output signals from comparators 7A and 7B are supplied to the NAND circuit 8 respectively.

Figure 2:
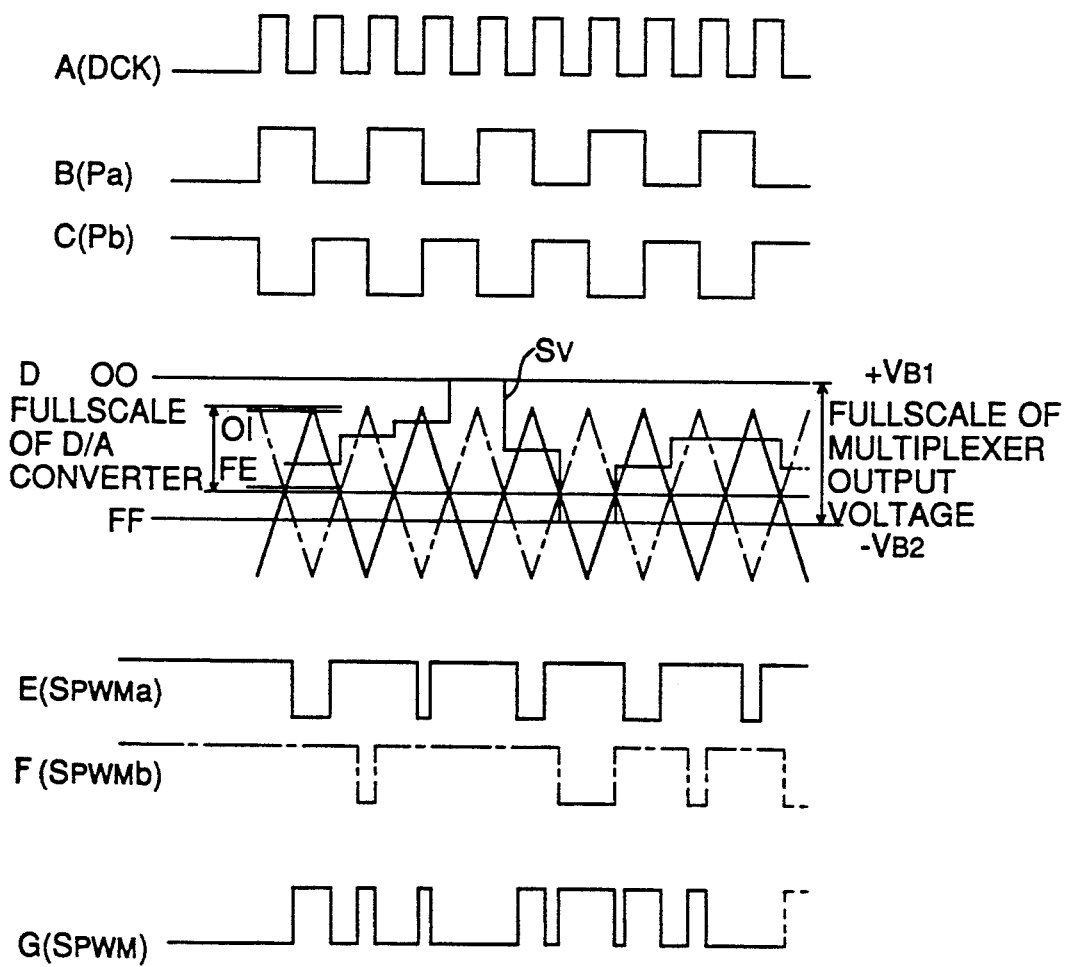
FIG. 2 is a time chart showing operations of the modulation circuit of the first example.

In the structure described above, when the dot clock (DCK) is shown by A in FIG. 2, the pulse signals Pa and Pb, having reverse phase to each other as shown by B and C in the drawing, also having a period which is twice as long as that of the dot clock (DCK), are outputted from the normal output terminal Q and the reversal output terminal Q-bar of the D flip-flop 1. Then, triangular pattern signals Spa and Spb, the period of which is twice as long as that of the dot clock (DCK) as shown by a continuous line and a one-dotted-chain line in D in the drawing, are supplied to comparators 7A and 7B.

Therefore, when the image signal Sv is as shown by the continuous line in D in the drawing, a pulse width modulation signal (SPWMa), the wave form of which is formed at a one dot interval as shown by E in the drawing, is outputted from the comparator 7A, and a pulse width modulation signal (SPWMb), the wave form of which is formed at a one dot interval as shown by F in the drawing, which is not the same form as that of the foregoing modulation signal SPWMa, is outputted from the comparator 7B.

Accordingly, a pulse width modulation signal (SPWM), the period of which is the same as that of the dot clock formed according to the pixel data (DATA) as shown by G in the drawing, is outputted from the NAND circuit 8.

According to the example, the pattern signals Spa and Spb are generated according to the pulse signals Pa and Pb, into which the dot clock (DCK) is divided by the D flip-flop 1. That is, the pattern signals are used under the condition that variation of the duty ratio of the dot clock (DCK) is eliminated. Therefore, distortion is not generated in the pattern signals Spa and Spb, and thereby the linearity of the modulation can be prevented from becoming worse, and the gradation reproducibility of a reproduced image can be prevented from being deteriorated.

The upper halves of the pattern signals Spa and Spb, the phases of which are reverse to each other, are compared with the image signal Sv by the comparators 7A and 7B. The pulse width modulation signals SPWMa and SPWMb, the wave forms of which are formed at a one dot interval, are outputted from comparators 7A and 7B, respectively. The pulse width modulation signal (SPWM, a signal for internal modulation of the laser beam), the period of which is the same as that of the dot clock (DCK), is obtained from the NAND circuit 8. Accordingly, the number of sampling can be secured, and thereby the resolution of the reproduced image is not deteriorated.

Further, the image signal Sv is set so that it is out of the amplitude area of pattern signals Spa and Spb when the image data (DATA) is 00H (minimum value) or FFH (maximum value). Therefore, the pulse width modulation signal is set to a high level with respect to 00H (minimum value), or a low level with respect to FFH (maximum value) in comparators 7A and 7B. Due to the foregoing, when the image data (DATA) is 00H (minimum value), the laser (a light source) is not turned on, and when the image data (DATA) is FFH (maximum value), the laser is turned on fully. Thereby, a white background and a solid area can be reproduced without being affected by fluctuations caused by noises of the pulse width modulation. Therefore, superior image quality can be obtained when characters, which are divided into the white background and solid area, are printed.

In the example, in the case where the image data (DATA) is maximum or minimum, when the output of the DC source is outputted to comparators 7A and 7B instead of a converted analog signal of the pixel data (DATA), the image signal, which is compared with the pattern signal, is set out of the amplitude area of the pattern signal. However, when the DC source is added to the converted analog signal of the pixel data (DATA), the image signal Sv, which is compared with the pattern signal by comparators 7A and 7B, can be set also out of the amplitude area of the pattern signal.

In the example, the image signal Sv, which is compared with pattern signals Spa and Spb, is set out of the amplitude area of the pattern signals Spa and Spb when the pixel data (DATA) is 00H (minimum value) or FFH (maximum value). However, the same effects as that of the foregoing example can be obtained also when the level of the pattern signals Spa and Spb is set out of the amplitude area of the image signal Sv in the case where the pixel data (DATA) is 00H (minimum value) or FFH (maximum value).

Figure 3:
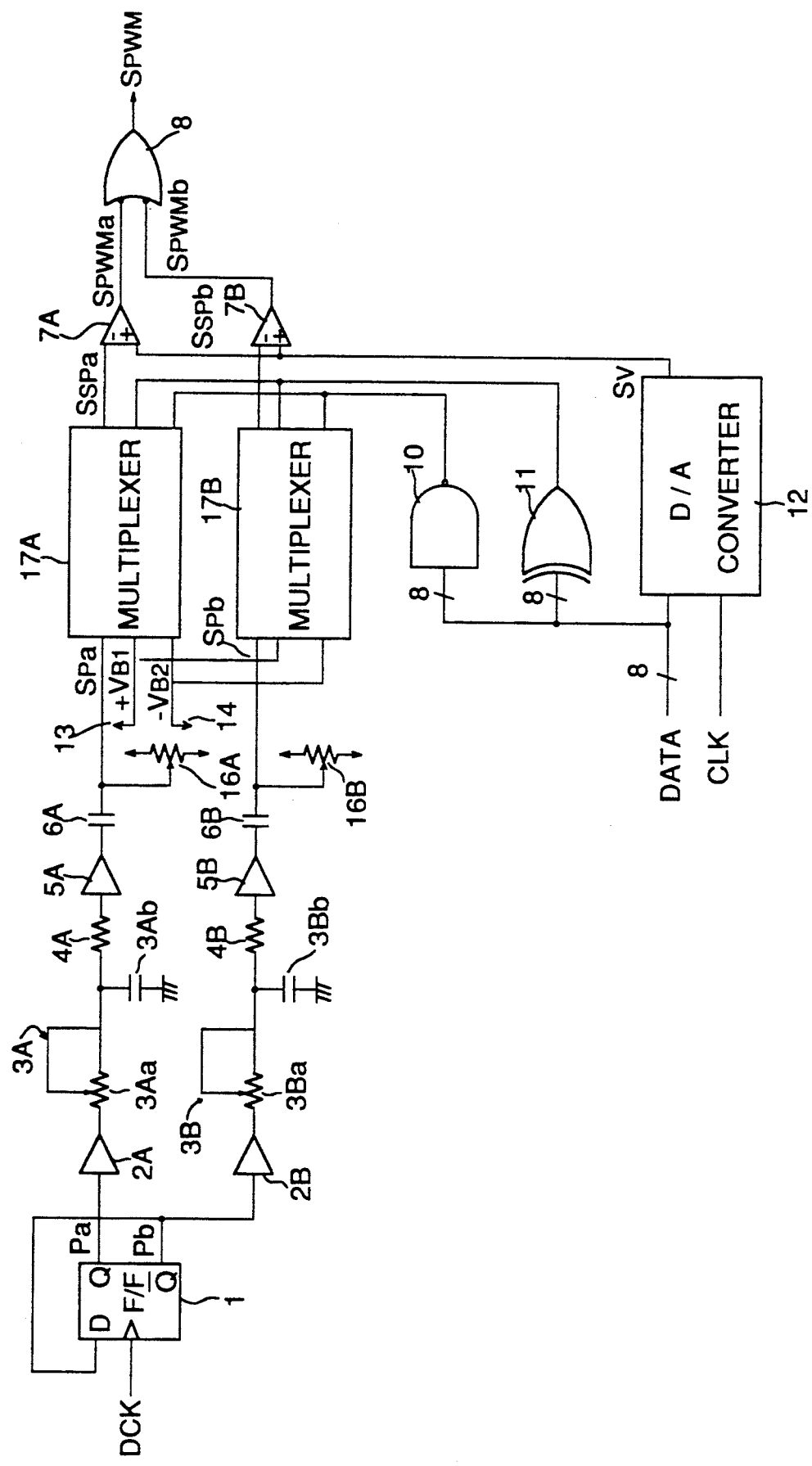
FIG. 3 is a circuit diagram showing a structure of a modulation circuit of a second example of the present invention.
Figure 4:
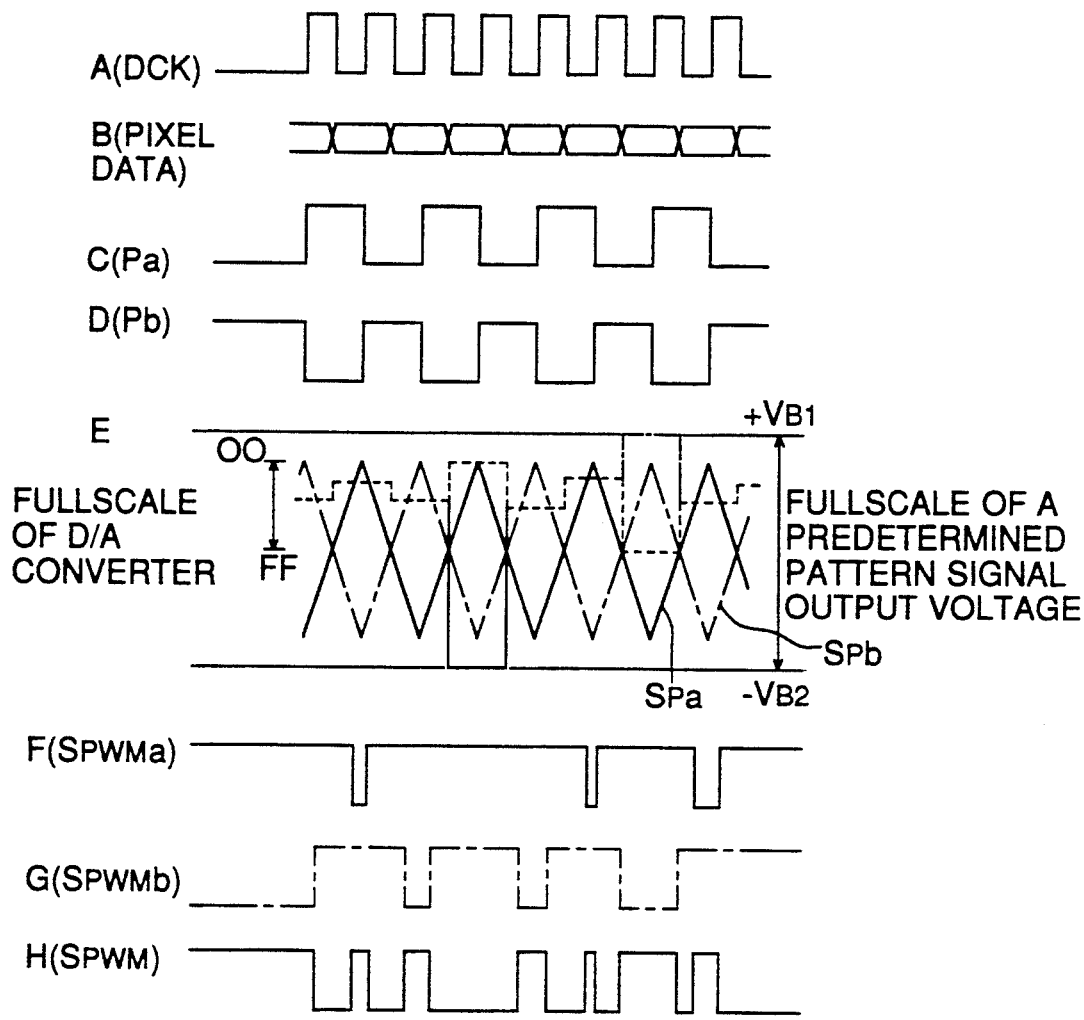
FIG. 4 is a time chart showing operations of the modulation circuit of the second example.
Figure 5:
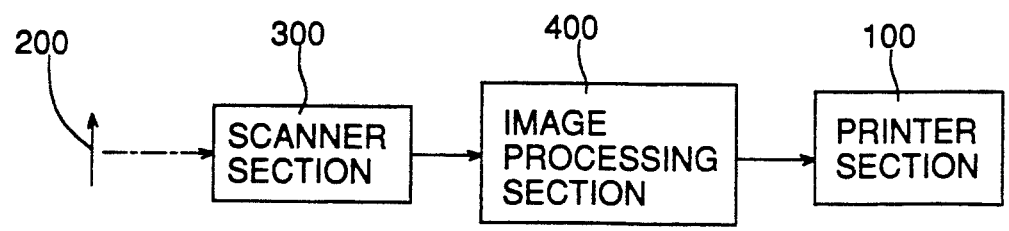
FIG. 5 is a block diagram showing a basic structure of a digital copying machine.

The structure of the modulation circuit, by which the level of pattern signals Spa and Spb is changed, is shown in FIG. 3. Referring to the time chart in FIG. 4, the structure and operation of the modulation circuit shown in FIG. 3 will be described as follows. In FIG. 3, the same elements as those in FIG. 1 are denoted with the same symbols and numbers as those in FIG. 1, and an explanation will be omitted.

In FIG. 3, the structure by which pattern signals Spa and Spb (triangular waves) are generated respectively using the dot clock (DCK), is the same as that of the modulation circuit in FIG. 1. However, the pattern signals Spa and Spb are not outputted directly to comparators 7A and 7B, but they are outputted to the comparators 7A and 7B through multiplexers 17A and 17B (an out-of-area pattern signal setting means).

The pattern signals Spa and Spb are supplied respectively to the multiplexers 17A and 17B, and the DC sources $+VB_1$ 13 and $-VB_2$ 14 are also supplied to them. The multiplexer 17a selectively outputs either one of the pattern signal Spa, the DC source $+VB_1$, or the DC source $-VB_2$ according to the selection signal. The multiplexer 17B selectively outputs either one of the pattern signal Spb, the DC source $+VB_1$, or the DC source $-VB_2$ according to the selection signal.

As the selection signals, outputs from the NAND circuit 10, to which the 8 bit pixel data (DATA) is supplied, and the EX-OR circuit (exclusive-OR) 11 are used in the same manner as that of the multiplexer 15 in the modulation circuit shown in FIG. 1. For example, when the 8 bit pixel data (DATA) is 01H to FEH, the output of the NAND circuit 10 is high level, and the output of the EX-OR circuit 11 is high level. At this time, the multiplexers 17A and 17B output the pattern signals Spa and Spb directly to comparators 7A and 7B.

On the other hand, when the pixel data (DATA) is 00H (minimum value), the output of the NAND circuit 10 is high level, and the output of the EX-OR circuit 11 is low level. At this time, the multiplexers 17A and 17B select the DC source $-VB_2$, and supply it to comparators 7A and 7B as pattern signals Sspa and Sspb.

Further, when the pixel data (DATA) is FFH (maximum value), the output of the NAND circuit 10 is low level, and the output of the EX-OR circuit 11 is low level. At this time, the multiplexers 17A and 17B select the DC source $+VB_1$, and supply it to comparators 7A and 7B as pattern signals Sspa and Sspb.

As described above, the pattern signals Spa and Spb (triangular waves), which are set so that they are normally just in the range of the amplitude (full scale) of the image signal Sv, are outputted from the multiplexers 17A and 17B when the pixel data (DATA) is 01H to FEH. When the pixel data (DATA) is 00H (minimum value), the DC source $-VB_2$ is selectively outputted and when the pixel data (DATA) is FFH (maximum value), the DC source $+VB_1$ is selectively outputted.

The voltage of the DC sources $+VB_1$ 13 and $-VB_2$ 14 are respectively set on the positive side or on the negative side of the amplitude area of the image signal Sv so that they are out of the amplitude area of the image signal Sv.

Accordingly, the pulse width modulation signals SPWMa, and SPWMb outputted from the comparators 7A and 7B are fixed to a high level when the pixel data (DATA) is 00H (minimum value), and to a low level when the pixel data (DATA) is FFH (maximum value). Thereby, the pulse width modulation signal (SPWM) which is finally obtained as an output of the NAND circuit 8, into which the pulse width modulation signals SPWMa and SPWMb are inputted, is fixed to a high level when the pixel data is 00H (minimum value), and to a low level when the pixel data is FFH (maximum value). Then, the signal SPWM is outputted as a pulse width modulation signal with a zero pulse width.

Accordingly, without any influence due to noises of the pulse width modulation, the laser (light source) is not turned on when the pixel data (DATA) is 00H (minimum value), and turned on fully when the pixel data (DATA) is FFH (maximum value), so that the white background and the solid area are excellently reproduced. Therefore, when characters which can be divided into the white background and the solid area are printed, excellent image quality can be obtained.

Further, also in the structure by which the pulse width modulation signal with a zero pulse width is obtained when the level of the pattern signals Spa and Spb is changed as described above, in the case where the pixel data (DATA) is 00H (minimum value) or FFH (maximum value), the pattern signals Spa and Spb may be set to a level out of the amplitude area when the DC voltage is added to the pattern signals Spa and Spb.

As described above, according to the image forming apparatus of the present invention, in the structure by which the pulse width modulation signal is formed, which is used in order to internally modulate the light source when the image signal is compared with the pattern signal with a predetermined period, the pulse width modulation signal with a zero pulse width can be obtained when the image signal is maximum or minimum. Therefore, there is an advantage in that the white background and solid area corresponding to the maximum value and minimum value of the image signal can be accurately reproduced without being influenced by the fluctuation of the pulse width modulation.

What is claimed is:

1. An apparatus for forming an image in accordance with image signals representing density levels that range between a maximum density level and a minimum density level, the apparatus comprising:

means for irradiating a recording member with an image light to form the image; and means for modulating said image light in accordance with the image signals, said modulating means including means for generating a reference pattern signal shaped in a wave form having a predetermined amplitude range and frequency, wherein the reference pattern signal represents the density levels between the maximum density level and the minimum density level so that the density level of each image signal is within the amplitude range of the reference pattern signal, means for discriminating whether the density level of each image signal is the maximum density level or the minimum density level, means for comparing the density level of said image signal with said reference pattern signal when the density level of said image signal is discriminated as not being the maximum density level or the minimum density level and for generating a pulse width modulation signal to modulate said image light in accordance with results of the comparison, and means for shifting the density level of said image signal to a respective predetermined shifted density level that is out of said amplitude range of said reference pattern signal when the density level of said image signal is discriminated to be the maximum density level or the minimum density level so that the comparing means compares the respective predetermined shifted density level with the reference pattern signal when the density level of said image signal is discriminated to be the maximum density level or the minimum density level.

2. The apparatus of claim 1, wherein said shifting means includes means for generating a shifted density level signal having the respective predetermined shifted density level so that the shifting means uses the generated shifted density level signal in place of said image signal when the density level of said image signal is discriminated to be the maximum density level or the minimum density level.

3. The apparatus of claim 1, wherein said shifting means includes means for processing said image signal so as to shift the density level of said image signal out of said amplitude range of the reference pattern signal when the density level of said image signal is discriminated to be the maximum density level or the minimum density level.

4. An apparatus for forming an image in accordance with image signals representing density levels that range between a maximum density level and a minimum density level, the apparatus comprising:

means for irradiating a recording member with an image light to form the image; and means for modulating said image light in accordance with the image signals, said modulating means including means for generating a reference pattern signal shaped in a wave form having a predetermined amplitude range and frequency, wherein he reference pattern signal represents the density levels between the maximum density level and the minimum density level so that the density level of each image signal is within the amplitude range of the reference pattern signal, means for discriminating whether the density level of each image signal is the maximum density level or the minimum density level, means for comparing the density level of said image signal with said reference pattern signal when the density level of said image signal is discriminated as not being the maximum density level or the minimum density level and for generating a pulse width modulation signal to modulate said image light in accordance with results of the comparison, and means for selecting a respective alternate reference pattern signal having an amplitude beyond the density level range of said image signals when the density level of said image signal is discriminated to be the maximum density level or the minimum density level so that the comparing means compares the density level of said image signal with the respective alternate reference pattern signal when the density level of said image signal is discriminated to be the maximum density level or the minimum density level.

* * * * *

UNITED STATES PATENT AND TRADEMARK OFFICE
CERTIFICATE OF CORRECTION

PATENT NO. : 5,331,432
DATED : July 19, 1994
INVENTOR(S) : Kouichi Sawada et al.

It is certified that error appears in the above-indentified patent and that said Letters Patent is hereby corrected as shown below:

TITLE PAGE

Attorney, Agent, or Firm, after "Henderson" insert --,--.

Claim 4, column 10, line 12 change "he" to --the--.

Signed and Sealed this

Eleventh Day of April, 1995

Attest:

BRUCE LEHMAN

Attesting Officer

Commissioner of Patents and Trademarks